United States Patent [19]

Johnson et al.

[11] 4,259,475

[45] Mar. 31, 1981

[54] PREPARATION OF LINEAR CRYSTALLINE HOMOPOLYBENZYL

[75] Inventors: Burnett H. Johnson, Baytown, Tex.; John E. Chandler, Stamford, Conn.; Robert W. Lenz, Amherst, Mass.

[73] Assignee: Exxon Research & Engineering Co., Florham Park, N.J.

[21] Appl. No.: 25,180

[22] Filed: Mar. 29, 1979

[51] Int. Cl.³ .............................................. C08G 61/02
[52] U.S. Cl. .................................. 528/397; 528/217; 528/396
[58] Field of Search ................... 528/397, 396, 217

[56] References Cited

U.S. PATENT DOCUMENTS

| 2,241,488 | 5/1941 | Sparks et al. | 528/397 |
|---|---|---|---|
| 2,870,098 | 1/1959 | Martin et al. | 528/396 |
| 3,346,514 | 10/1967 | Isaacson et al. | 528/397 |
| 3,418,259 | 12/1968 | Kennedy et al. | 528/397 |
| 3,770,661 | 11/1973 | Fritz | 528/396 |

OTHER PUBLICATIONS

Riku. Gahu Kenkyusho Hikiku, 37, 445, (1961)—Yamada et al., English Translation.
Bull. Soc. Chim. France, 43, 53, (1885)—Friedel et al., English Translation.
Rev. Chim. (Bucharest), 14, 385, (1963)—Iovu, English Translation.
Analele Univ. C. I. Parhon, Ser. Stiint, Nat., 9, 189, (1963)—Iovu et al., English Translation.
J. Amer. Chem. Soc., 63, (1941), 3525.
Chemical Abstracts, vol. 57, (1962), 15338c.
Journal American Chemical Society, 54, (1932), 1513.
Journal of Polymer Science, XV, (1955), pp. 503-514.
J. Gen. Chem., USSR, English Translation, 19, (1949), 647.
Journal of Polymer Science, Part A-1, vol. 7, (1969), pp. 2679-2687.

Primary Examiner—Harold D. Anderson
Attorney, Agent, or Firm—M. B. Kurtzman

[57] ABSTRACT

Polybenzyls of high molecular weight and high crystallinity are obtained by polymerizing aralkyl halides in the presence of a catalyst comprising a complex of a Friedel-Crafts catalyst with a complexing agent which can be a nitroarene or a nitroalkane. The complex catalyst allows the polymerization to be run at higher temperatures and with higher rates. Yields are obtained up to 100%.

12 Claims, No Drawings

PREPARATION OF LINEAR CRYSTALLINE HOMOPOLYBENZYL

BACKGROUND OF THE INVENTION

1. Field of the Invention

This invention relates to an improved process for the production of linear crystalline polymers of aralkyl halides and to the polymer compositions produced thereby. In particular, this invention relates to a process for preparing crystalline polybenzyls and alkyl substituted derivatives thereof, which crystalline polybenzyls have melting points not heretofore obtainable. More particularly, this invention relates to the low temperature, polymerization of α-alkylbenzyl halides in the presence of a complex of a Friedel-Crafts catalyst and a complexing agent which is nitroalkane or a nitroarene. The polymerizable α-alkylbenzyl halides which can be readily employed are represented by the following structural formula:

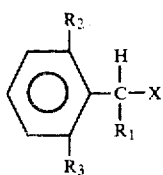

wherein $R_1$ is a $C_1$-$C_4$ alkyl group, $R_2$ and $R_3$ are the same or different and are each selected from the group consisting of hydrogen and $C_1$-$C_4$ alkyl groups and X is halogen. Still more particularly, this invention relates to the polymerization of benzyl halides in the presence of a complex of a Friedel-Crafts catalyst and a complexing agent which can be a nitroalkane or a nitroarene at temperatures of between about $-65°$ C. to about $-40°$ C.

2. Description of the Prior Art

The polymerization of benzyl halides in the presence of Friedel-Crafts catalyst is well known in the art. See, for example, Ralph A. Jacobson, "Polymers from Benzyl Chloride and Related Compounds", J. Amer. Chem. Soc., 54, 1513 (1932); O. C. Dermer et al, "Catalysts for the Polymerization of Benzyl Chloride", J. Amer. Chem. Soc., 63, 3525 (1941); H. C. Haas et al, "Polybenzyl Type Polymers", J. Pol. Sci., 15, 503 (1955); C. Friedel et al, "Comments in a Meeting", Bull. Soc. Chim. France, 43, 53 (1885); and N. N. Lebedev et al, "High Molecular Weight Compound XXII the Polycondensation of Benzyl Chloride", J. Gen. Chem., USSR, English translation, 19, 647 (1949). Depending on the Friedel-Crafts catalyst employed for the polymerization of the polybenzyls, the resins obtained were more or less insoluble in benzene or soluble in benzene, have softening points over the range of about 75° C. to 80° C. and melt at about 95° C. and were branched.

It is also known to use catalysts such as metal powders, oxides or aluminum alkyls for the polymerization of benzyl chloride. See, for example, E. J. Spanier et al, "Condensation of Benzyl Chloride Catalized by Group II Metals", J. Pol. Sci., A-1, 7, 2679 (1969); M. Iovu et al, "Catalytic Reactions with Alkyl-Metal Halides V. Polycondensation of Benzyl Chloride", Analele Univ. C. I. Parhon, Ser. Stiint, Nat., 9, 189 (1960); M. Iovu, "Polycondensation Reactions with Organo-Aluminum Catalysts", Rev. Chim. (Bucharest), 14, 385 (1963); and A. Yamada et al, "Poly(Benzyl Chloride I. Polymerization of Benzyl Chloride by Use of Triethylaluminum as Catalyst", Riku. Gaku Kenkyusho Hikiku, 37, 445 (1961). The polymers prepared in the presence of metal powders, oxides or aluminum alkyls are generally highly branched, low molecular weight amorphous resins.

U.S. Pat. No. 3,346,514 of Isaacson et al, issued Oct. 10, 1967, discloses a method of preparing polybenzyls in the presence of a Group IVB to VIB and Group VIII transition metal compound and a Group I to III organometal reducing agent. The yields obtainable under the disclosed method is relatively low, the molecular weights obtainable are quite low and although the disclosure discusses the crystallinity of the polybenzyls the crystallinity obtainable is nevertheless low.

In U.S. Pat. No. 3,418,259 of Kennedy et al there is disclosed a process of producing polybenzyls in the presence of a Friedel-Crafts catalyst. The process involves using very low temperatures, i.e., about $-130°$. The process obtains polybenzyls in extremely low yields and having very low molecular weights and low levels of crystallinity. Furthermore, because of the low molecular weights obtained, i.e., less than about 6700, the polymers formed very brittle films.

SUMMARY OF THE INVENTION

In accordance with this invention, it has been found that when an aralkyl halide such as α-methyl benzyl chloride is polymerized in the presence of a complex of a Friedel-Crafts catalyst with a complexing agent which is a nitroarene or a nitroalkane a substantially high molecular weight, highly crystalline linear polybenzyl is obtained. It is further been found that by using the complex catalyst one can polymerize at higher temperatures over longer periods of time as compared with the process involving polymerizing aralkyl halides in the presence of an uncomplexed Freidel-Crafts catalyst.

Accordingly, it is an object of this invention to provide an improved process for the polymerization of α-alkylbenzyl halides to linear polybenzyls. It is yet another object of this invention to provide a process for the polymerization of α-alkylbenzyl halides at reaction temperatures in the range of about $-65°$ C. to about $-40°$ C. It is another object of this invention to provide a novel polybenzyl having molecular weights greater than 7,000. It is still another object of the invention to provide a method of polymerizing α-alkylbenzyl halides to highly crystalline, relatively high molecular weight polymers. It is still another object to provide a method of obtaining high yields of highly crystalline high melting polymers when polymerizing α-alkylbenzyl halides in the presence of Friedel-Crafts type catalysts.

DESCRIPTION OF THE PREFERRED EMBODIMENTS

According to the present invention high molecular, high melting crystalline polybenzyls are prepared by polymerizing aralkyl halides having the following structural formula:

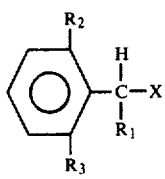

wherein $R_1$ is a $C_1-C_4$ alkyl group and $R_2$ and $R_3$ are each selected from the group consisting of hydrogen and $C_1-C_4$ alkyl groups, and X is halogen, in a halogenated hydrocarbon solvent with a catalyst comprising a complex of a Friedel-Crafts type catalyst and a complexing agent represented by the formula: $RNO_2$ wherein R is selected from the group consisting of alkyl groups having from 1 to 6 carbon atoms, cycloalkyl groups having from 1 to 6 carbon atoms, aryl groups, alkaryl groups, haloaryl groups, haloalkaryl groups wherein the halogen is substituted on the aryl ring and aryl arylene ethers wherein the aryl, alkaryl, haloaryl, haloalkaryl and aryl arylene ethers can have from 1 to 13 carbon atoms, at a temperature in the range of about −65° C. to about −40° C. in a halogenated hydrocarbon solvent. It has been discovered that by employing the complex catalyst one can polymerize the aralkyl halides at higher reaction temperatures and over longer periods of time to obtain higher yields as compared with that disclosed in U.S. Pat. No. 3,418,259. The obtained polybenzyls made in accordance with the invention manifest higher crystallinity, molecular weight, and have higher melting points than that which could be obtained in accordance with U.S. Pat. No. 3,418,259. The polybenzyls obtained in accordance with this invention are further obtained in high yields such as up to 100% yield.

Typical, but non-limiting examples of the suitable aralkyl halide compounds which can be utilized in the present novel process include: α-methylbenzyl chloride, α-methylbenzyl bromide, α-methylbenzyl fluoride, 2-methyl-α-methylbenzyl chloride, α-ethylbenzyl chloride, α-propylbenzyl chloride, α-methylbenzyl iodide, and the like. The preferred aralkyl halides are α-methylbenzyl halides such as α-methylbenzyl chloride, α-methylbenzyl bromide and α-methybenzyl fluoride. The most preferred is α-methylbenzyl chloride.

Any of the Friedel-Crafts type catalysts conventionally employed in cationic polymerizations can be employed as the component of the complex catalyst in the present novel process. These include the conventional Group IIIA metal halides, such as aluminum chloride. Typical, but non-limiting examples of suitable metal halides include: aluminum chloride, aluminum bromide, boron trifluoride, gallium trichloride and the like.

In accordance with the preferred embodiments of this invention the Friedel-Crafts component of the complex catalyst can be aluminum bromide and aluminum chloride and most preferred, aluminum chloride.

Suitable but non-limiting examples of the nitroalkanes which can be usefully employed as complexing agents are: nitromethane, nitroethane, 2-nitropropane, 2-methyl-2-nitropropane, and nitrocyclohexane. Suitable but non-limiting examples of the nitroarenes which can be useful employed as complexing agents are: nitrobenzene, 4-ethylnitrobenzene, 1-chloro-2-nitrobenzene, 1-chloro-3-nitrobenzene, 1-chloro-4-nitrobenzene, 1-bromo-2-nitrobenzene, 1-bromo-3-nitrobenzene, 1-bromo-4-nitrobenzene, 1-bromo-4-chloro-2-nitrobenzene, 1-iodo-2-nitrobenzene, 1-iodo-3-nitrobenzene, 1-iodo-4-nitrobenzene, 1-fluoro-2-nitrobenzene 1-fluoro-3-nitrobenzene, 1-fluoro-4-nitrobenzene, 2,3-dichloronitrobenzene, 2,4-dichloronitrobenzene, 3,4-dichloronitrobenzene, 1,2,3-trichloro-4-nitrobenzene, 1,2,4-trichloro-5-nitrobenzene, 2,3,4,5-tetrachloronitrobenzene, 2,3,5,6-tetrachloronitrobenzene, 2-nitrotoluene, 3-nitrotoluene, 4-nitrotoluene, 2-chloro-4-nitrotoluene, 2-chloro-6-nitrotoluene, 2-fluoro-5-nitrotoluene, 4-fluoro-2-nitrotoluene, 5-fluoro-2-nitrotoluene, 2,6-dichloro-3-nitrotoluene, 2-bromo-4-nitrotoluene, 2-nitro-m-xylene, 3-nitro-o-xylene, 4-nitro-o-xylene, 4-nitro-m-xylene, 5-nitro-m-xylene, 2-nitronaphthalene, 2-bromo-3-nitronaphthalene, 2-chloro-3-nitronaphthalene, 1,2-dichloro-3-nitrohaphthalene, 9-nitroathracene, 2-nitrobiphenyl, 3-nitrobiphenyl, 4-nitrobiphenyl, 4-bromo-3-nitrobiphenyl, 4-chloro-3-nitrobiphenyl, 2-nitrofluorene, 2-methyl-1-nitronaphthalene, 1-chloro-8-nitronaphthalene and para-nitrophenyl phenyl ether.

The Friedel-Crafts catalysts complexed with nitroarenes or nitroalkanes are well known and do not constitute a part of the instant invention. The method of preparing the complexes is also well known and is simply accomplished by, for example, mixing a Friedel-Crafts catalyst such as aluminum chloride with a complexing agent such as nitroethane, adding a suitable solvent such as ethyl chloride into the aluminum chloride complexing agent at a low temperature such as −78° C. and storing under a blanket of nitrogen at that temperature. Since the catalyst complex is difficulty soluble in the solvent successive of warmings to about −25° C. and coolings can be employed so as to obtain as much of the catalyst complex into solution. The ratio of complexing agent to Friedel-Crafts catalyst can vary from about 1:1 to about 7:1, and preferably 4:1 to 7:1 and most preferably 5:1 to 6:1. Higher ratios of complexing agent to Friedel-Crafts can be employed without any detrimental effect. In accordance with this invention the preferable catalyst complexes are aluminum chloride-nitroethane complex and aluminum chloride nitrobenzene complex.

The amount of catalyst complex employed can vary over a considerable range but, in general, the mole ratio of total monomer feed to catalyst complex will range between about 100:1 to about 5:1, preferably between about 30:1 to about 10:1. In general, the catalyst employed is usually dissolved in a portion of the diluent employed in the polymerization reaction. The solution is precooled and added to a solution of the monomers to be polymerized in the same solvent, or a different but compatible solvent, and maintained at the polymerization temperature. Alternatively, the monomer feed can be added to a precooled catalyst complex-diluent solution. The actual sequence of admixing the monomer, catalyst complex and diluent is not critical to the present novel process and any suitable sequence can be employed.

In preparing the crystalline polybenzyls in accordance with the present process is desirable to perform the polymerization reaction in a halogenated hydrocarbon diluent. Suitable compounds which can be employed, either as solvent for the catalyst complex or as the polymerization (condensation) diluent, are the conventional alkyl halides which are inert and liquid under the polycondensation temperature conditions employed. Examples of solvents that have been found to be suitable, depending on the particular temperature employed, include: methyl chloride, ethyl chloride, propyl chloride, chloroform, ethylene dichloride, methyl bromide, ethyl bromide, 1,1-dichloroethane, methylene dichloride and mixtures thereof. The preferred diluents are methyl chloride and ethyl chloride, although other suitable diluents selected from those hereinabove mentioned could just as easily be employed. Generally, between about 50 and about 500 parts of diluent are added per 100 parts of monomer feed. The polymerization of the benzyl halides in accordance with the present novel process can be performed in bulk, i.e., without added diluent. In that case, the excess monomer, which is itself a halogenated hydrocarbon, acts as the diluent. The temperatures employed in preparing the crystalline polybenzyls in accordance with the present invention, in general, range between about $-65°$ C. to about $-40°$ C. The preferred temperature when employing the preferred aralkyl halide is about $-65°$ C. The pressure employed in accordance with the present invention will generally be at or near atmospheric.

In accordance with the present invention it has been discovered that by using the complexing agent in combination with the Friedel-Crafts catalyst in addition to being able to employ higher polymerization temperatures than previously had been useful one can now run the polymerization reaction over a longer time period. Depending upon the monomer and temperature employed, reaction times can vary between about 1 hour and 30 hours and preferably between about 8 hours and 20 hours. Of course, the times disclosed in U.S. Pat. No. 3,418,259, i.e., from about 1 second to about 8 hours, can be employed.

The polybenzyls prepared in accordance with the present invention are generally colorless, i.e., white, powdery solids and range in the weight average molecular weight of between about 7,000 and 14,000 or higher. However, by employing shorter polymerization temperatures one can obtain low molecular products. The polybenzyls prepared in accordance with the present invention are highly crystalline, and exhibit a higher melting point than heretofore obtainable. Crystalline polybenzyls having melting points in the range of about 199° C. to about 250° C. have been obtained. The crystalline polymers readily lend themselves to the formation of films and molding compositions or, in other words, to uses in which high structural strength materials are customarily employed. These crystalline polymers are novel in that higher molecular weight polybenzyls had heretofore not been obtainable and the uses to which they are put are those which other similar polymers of high crystallinity have been put.

A significant advantage of the present invention is that by employing the catalyst complex as described herein and running the polycondensation reactions at temperatures described above. One can obtain yields of polybenzyls in the range of about 25% to 100% and usually yields of about 100%. The molecular weight of the polymers prepared in the instant examples were obtained by means of GPC.

The various aspects and modifications of the present novel process will be made more clearly apparent by reference to the following description and accompanying examples.

The Friedel-crafts complex was prepared by adding to a 150 ml Schlerk tube fitted with a rubber septum 6.7 g aluminum chloride and 25.1 g nitroethane. To the aluminum chloride complexing agent mixture there was added 100 ml of ethyl chloride by condensing it into the flask at $-78°$. The mixture was then warmed to $-25°$ C. and cooled several times in order to obtain the catalyst in solution.

The molecular weight of the linear crystalline polybenzyls of this invention were determined by gel permeation chromatography.

EXAMPLE 1

Into a 3-neck, 300 ml round-bottom flask equipped with a mechanical stirrer and rubber septums there was added 100 ml of ethyl chloride maintained at a temperature of $-78°$ C. The monomer, α-methylbenzyl chloride, was added via a syringe while the flask was maintained under dry nitrogen at $-78°$ C. The previously prepared catalyst complex and monomer solutions are then connected by means of teflon tubing through the rubber septums and the whole system was lowered to a temperature of $-65°$ C. Thereafter the aluminum chloride complex solution was slowly pumped over a period of one hour through the teflon tube into the reaction flask by positive dry nitrogen pressure while stirring the reaction mixture. The reaction was run for 20.5 hours. The reaction was terminated by pouring the cold solution into two liters of vigorously stirred methanol. Immediate precipitation occurred. The mixture was stirred overnight. The precipitate was filtered, washed with dilute hydrochloric acid and methanol, and dried and then vacuum dried at 60° C. A highly crystalline polymer having a weight average molecular weight of 14,000 and a melting point of 229° C. was obtained in 100% yield. The result of the polymerization is summarized in Table I.

CONTROL 1

A system comprising a catalyst containing vessel, and α-methylbenzyl chloride in solution containing vessel was prepared as described in Example 1 except that the catalyst was uncomplexed aluminum chloride. The aluminum chloride solution was pumped slowly through the teflon tube into the reaction flask over a period of 1 hour by positive dry nitrogen pressure. The reaction was continued for 5 hours at which time no further polymerization was noticed by measuring the acidity of the nitrogen gas coming off the system. The results of Control 1 are summarized in Table I.

CONTROL 2

A system comprising a catalyst containing vessel, and α-methylbenzyl chloride in solution containing vessel was prepared as described in Example 1 except that the catalyst was uncomplexed aluminum chloride. The aluminum chloride solution was pumped slowly through the teflon tube into the reaction flask over a period of 4.5 hours by positive dry nitrogen pressure. The reaction was continued for 5 hours at which time no further polymerization was noticed by measuring the acidity of the nitrogen gas coming off the system. The results of Control 2 are summarized in Table I.

The invention has been described in detail with particular reference to preferred embodiment thereof, but it will be understood that the variations and modifications can be affected within the spirit and scope of the invention.

TABLE I

| | Friedel-Crafts Catalyst/ Complexing Agent | Solvent | Polymerization T° C. | Polymerization Time (hrs.) | Yields | $\bar{M}w$* | T°melt° C. |
|---|---|---|---|---|---|---|---|
| Control 1 | AlCl₃/- | ethyl chloride | −125 | 5 | 95 | 6,700 | 178 |
| Control 2 | AlCl₃/- | ethyl chloride | −78 | 4.5 | 72 | 2,900 | 112 |
| Ex. 1 | AlCl₃/ nitroethane | ethyl chloride | −65 | 20.5 | 100 | 14,000 | 229 |

*measured by GPC

What is claimed is:

1. A process for preparing a linear crystalline homopolybenzyl which comprises polymerizing an α-alkylbenzyl halide represented by the structural formula:

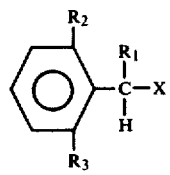

wherein $R_1$ is a $C_1$–$C_4$ alkyl group, $R_2$ and $R_3$ can be the same or different and are each selected from the group consisting of hydrogen and alkyl groups having from 1 to 4 carbon atoms and X is halogen in the presence of a Friedel-Crafts catalyst complexed with a complexing agent represented by the formula $RNO_2$ wherein R is selected from the group consisting of alkyl groups having from 1 to 6 carbon atoms, cycloalkyl groups having from 1 to 6 carbons, aryl groups, alkaryl groups, haloaryl groups, haloalkaryl groups wherein the halogen is substituted on the aryl ring and aryl arylene ethers wherein the aryl, alkaryl, haloaryl, haloalkaryl and aryl arylene ethers have from 1 to 13 carbon atoms, at a temperature in the range of about −65° C. to about −40° C. in a halogenated hydrocarbon solvent.

2. The process of claim 1 wherein the homopolybenzyl is obtained in yields in the range of about 25% up to 100%.

3. The process of claim 1 wherein the benzyl halide is selected from the group consisting of α-methylbenzyl chloride, α-methylbenzyl bromide and α-methylbenzyl iodide.

4. The process of claim 3 wherein the α-alkylbenzyl halide is α-methylbenzyl chloride.

5. The process of claim 1 wherein the halogenated hydrocarbon solvent is selected from the group consisting of methyl chloride, ethyl chloride, propyl chloride, chloroform, ethyl dichloride, methyl bromide, ethyl bromide, 1,1-dichloroethane, methylene dichloride and 1,1,2,2-tetrachloroethane.

6. The process of claim 5 wherein the solvent is methyl chloride or ethyl chloride.

7. The process of claim 1 wherein the Friedel-Crafts catalyst is selected from the group consisting of aluminum chloride and aluminum bromide and the complexing agent is selected from the group consisting of nitrobenzene and nitroethane.

8. The process of claim 1 wherein the mol ratio of complexing agent to Friedel-Crafts catalyst is from about 1:1 to about 7:1.

9. The process of claim 8 wherein the mol ratio of complexing agent to Friedel-Crafts catalyst is from about 4:1 to about 7:1.

10. The process of claim 8 wherein the Friedel-Crafts catalyst is aluminum chloride, the complexing agent is nitroethane and the solvent is ethyl chloride.

11. A process for preparing high molecular weight, crystalline homopoly-α-methylbenzyl having a melting point of about 229° C. comprising polymerizing α-methylbenzyl chloride in the presence of AlCl₃/nitroethane complex at a temperature of about −65° C. in ethyl chloride solvent and recovering poly-α-methylbenzyl.

12. The process of claim 11 wherein the poly-α-methylbenzyl has a weight-average molecular weight of about 14,000 as determined by gel permeation chromatography.

* * * * *